US009495715B2

United States Patent
Gerber et al.

(10) Patent No.: US 9,495,715 B2
(45) Date of Patent: Nov. 15, 2016

(54) SYSTEM, METHOD, AND MEDIUM FOR SOCIAL NETWORK INFORMATION FEED IN-LINE PURCHASING BY TEXT RECOGNITION

(71) Applicant: PAYPAL, INC., San Jose, CA (US)

(72) Inventors: Joshua Gerber, San Jose, CA (US); Christopher Boncimino, San Jose, CA (US)

(73) Assignee: PayPal, Inc., San Jose, CA (US)

( * ) Notice: Subject to any disclaimer, the term of this patent is extended or adjusted under 35 U.S.C. 154(b) by 0 days.

(21) Appl. No.: 14/181,385

(22) Filed: Feb. 14, 2014

(65) Prior Publication Data

US 2014/0236762 A1    Aug. 21, 2014

Related U.S. Application Data

(60) Provisional application No. 61/765,210, filed on Feb. 15, 2013.

(51) Int. Cl.
*G06Q 30/06* (2012.01)
*G06Q 50/00* (2012.01)

(52) U.S. Cl.
CPC .......... *G06Q 50/01* (2013.01); *G06Q 30/0633* (2013.01)

(58) Field of Classification Search
CPC .................................................. G06Q 30/06
USPC ............................. 705/26.1–27.2
See application file for complete search history.

(56) References Cited

U.S. PATENT DOCUMENTS

| | | | | |
|---|---|---|---|---|
| 7,792,709 | B1 * | 9/2010 | Trandal et al. | 705/26.1 |
| 2006/0184617 | A1 * | 8/2006 | Nicholas et al. | 709/203 |
| 2013/0290149 | A1 * | 10/2013 | Rashwan | 705/27.1 |
| 2013/0297440 | A1 * | 11/2013 | Bennett et al. | 705/26.3 |
| 2014/0058850 | A1 * | 2/2014 | Reckert et al. | 705/14.73 |

OTHER PUBLICATIONS

Ribbon (http://techcrunch.com/2013/02/05/payments-startup-ribbon-raises-1-6m-from-tim-draper-others-launches-new-way-to-take-payments-directly-in-the-facebook-news-feed/), Feb. 5, 2013.*
Synapse (http://adage.com/article/media/magazines-sell-subscriptions-facebook-news-feed/143813/), May 12, 2010.*

* cited by examiner

*Primary Examiner* — Jeffrey A Smith
*Assistant Examiner* — Jennifer Lee
(74) *Attorney, Agent, or Firm* — Haynes and Boone, LLP

(57) ABSTRACT

Embodiments described herein disclose a system and method for providing an improved user experience for purchasing a product within an information feed. An information feed is displayed which includes an information post having a product link or otherwise referencing a product. A selection of the product link or the referenced product is received, and product information for a product associated with the product link or referenced product is retrieved. The product information and a purchase selector are displayed within the information feed, in association with the information post. A selection of the purchase selector is received. User payment information is retrieved and displayed in association with the information post in the information feed. User payment information is transmitted, based on a received confirmation from a user. The purchase is then executed, and a confirmation message may be displayed.

20 Claims, 13 Drawing Sheets

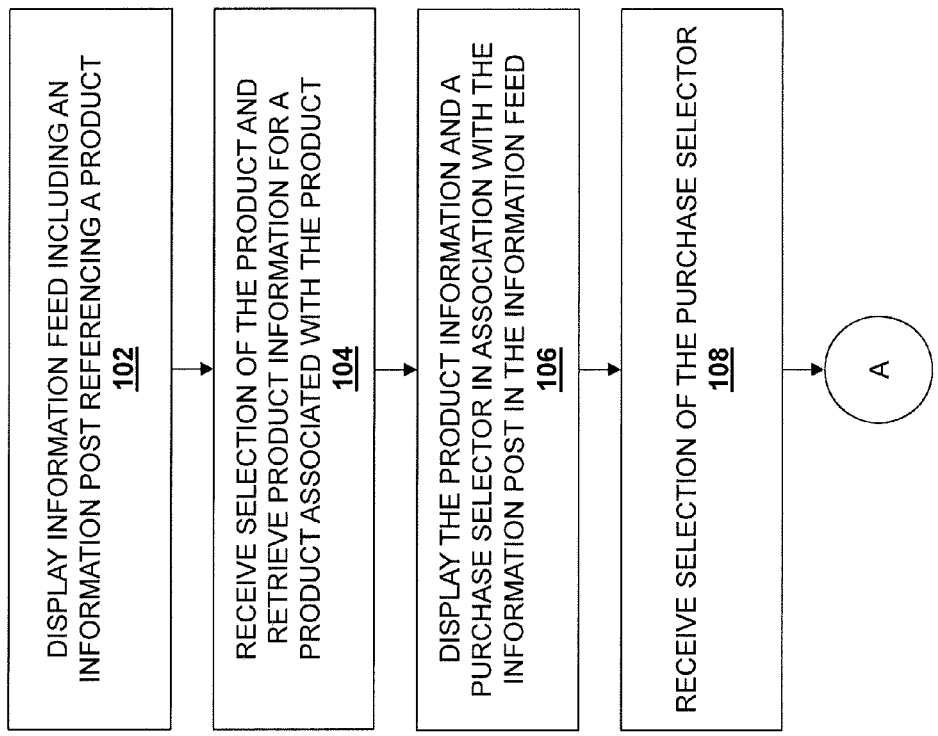

SYSTEM, METHOD, AND MEDIUM FOR SOCIAL NETWORK INFORMATION FEED IN-LINE PURCHASING BY TEXT RECOGNITION

CROSS REFERENCE TO RELATED APPLICATIONS

The present application claims priority to and incorporates by reference U.S. Provisional Patent Application Ser. No. 61/765,210, filed on Feb. 15, 2013.

BACKGROUND

1. Field of the Invention

The present disclosure generally relates to online and/or mobile payments and more particularly to making online and/or mobile purchases within an information feed.

2. Related Art

More and more consumers are purchasing items and services over electronic networks such as, for example, the Internet. Consumers routinely purchase products and services from merchants and individuals alike. The transactions may take place directly between a conventional or on-line merchant or retailer and the consumer, and payment is typically made by entering credit card or other financial information. Transactions may also take place with the aid of an on-line or mobile payment service provider such as, for example, PayPal, Inc. of San Jose, Calif. Such payment service providers can make transactions easier and safer for the parties involved. Purchasing with the assistance of a payment service provider from the convenience of virtually anywhere using a mobile device is one main reason why on-line and mobile purchases are growing very quickly.

Additionally, many consumers presently utilize information feeds, such as Twitter feeds and feeds provided by other social networking services and/or websites, to access rapidly updated information from individual Tweets or information posts in an information feed. Information posts may be posted by friends, colleagues, organizations, companies, and/or other parties known in the art. An individual user may follow other users to access and view a customized collection of such information posts as the user's information feed. Often, information posts include information regarding a product that is available for purchase. To purchase a product mentioned in an information post on an information feed, a user typically clicks on a hyperlink in the information post to launch a web browser application that is directed to a merchant website of a merchant selling the product, or searches for a merchant website that sells the product using a search engine. The user can then utilize the merchant website through the web browser to purchase the product. The need to launch a web browser application to access the merchant website, or search for that merchant website, in order to buy the product is time consuming and bothersome for the consumer, and may lead to lost sales for the merchant.

Thus, there is a need for an improved system and method for purchasing products referenced in information posts displayed in an information feed.

BRIEF DESCRIPTION OF THE FIGURES

FIG. 1a is a flow chart illustrating an embodiment of a portion of a method for purchasing products referenced in information posts displayed in an information feed;

Figure 1B:
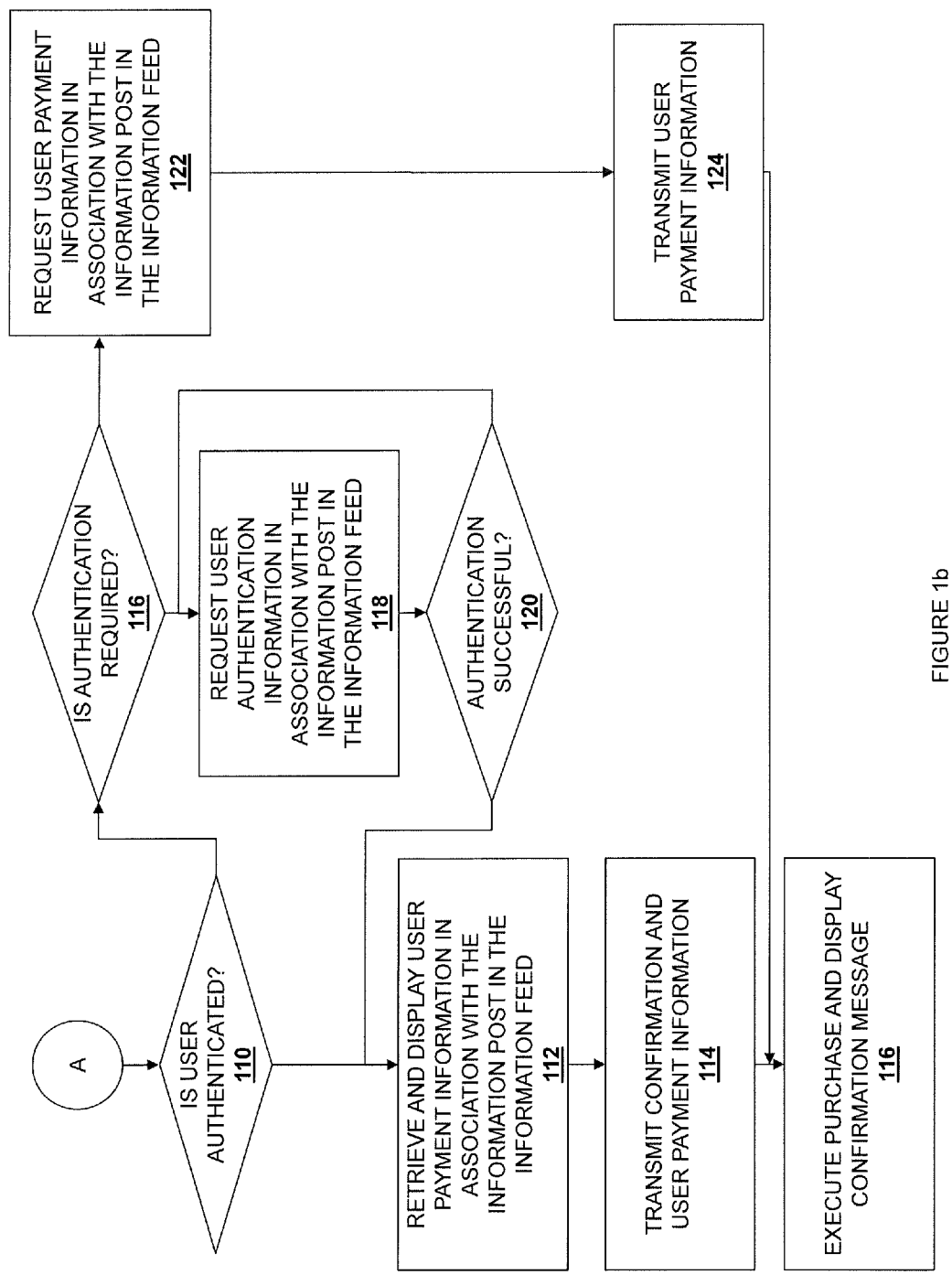
FIG. 1b is a flow chart illustrating an embodiment of a portion of a method for purchasing products referenced in information posts displayed in an information feed.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure provides a system and method for providing an improved user experience for purchasing a product within an information feed. An information feed is displayed which includes an information post having a product link or otherwise referencing a product. A selection of the product link or the referenced product is received, and product information for a product associated with the product link or referenced product is retrieved. The product information and a purchase selector are displayed within the information feed, in association with the information post (e.g., such that the product information and purchase selector appear to be an extension of, related to, or otherwise part of the information post). A selection of the purchase selector is received. User payment information may then be retrieved and displayed in association with the information post in the information feed. User payment information is then transmitted, based on a received confirmation from a user. The purchase is then executed, and a confirmation message may be displayed in association with the information post in the information feed. As such, a user may execute a purchase of a product referenced in an information post of their information feed in a manner that is "in-line" with that information feed, rather than having to launch a web browser application (or other application) to access or search for a merchant website that sells that product.

Referring now to FIGS. 1a and 1b, an embodiment of a method 100 for making purchases within an information feed is illustrated. In the embodiments and examples discussed below, a Twitter feed is used as an example of an information feed. However, other information feeds are also possible, such as Facebook news feeds, a Foursquare feed, an Instagram feed, a Rich Site Summary/Really Simple Syndication (RSS) feed, and/or a wide variety of other types of information feeds known in the art.

In some embodiments, an information feed provider, such as a social networking service provider, may provide a purchasing system that allows users accessing the information feed to purchase products based on those products inclusion in an information post in the information feed. For example, the information feed provider may provide an application programming interface (API) that allows payment service providers, payment account providers, and/or merchants to receive and transmit information via the information feed provider. As such, the payment service providers, payment account providers, and/or merchants may receive requests for product information and/or payment information, and may transmit product information and payment information to the user through the information feed provider. Similarly, the payment service providers, payment account providers, and/or merchants may receive payment information from a user to purchase a product through the information feed provider. Thus, the systems and methods discussed below may be performed through coordinated actions by an information feed provider, a payment service provider, a payment account provider, and/or a merchant. In other embodiments, a third party system provider may operate between the information feed provider and the payment service provider, payment account provider, and/or merchant to transfer the information necessary to perform the method 100 discussed below. While a few examples have been provided, one of skill in the art in possession of the present disclosure will recognize that that systems and methods may be enabled by the actions of one or more of any of the entities discussed above while remaining within the scope of the present disclosure.

Figure 2A:
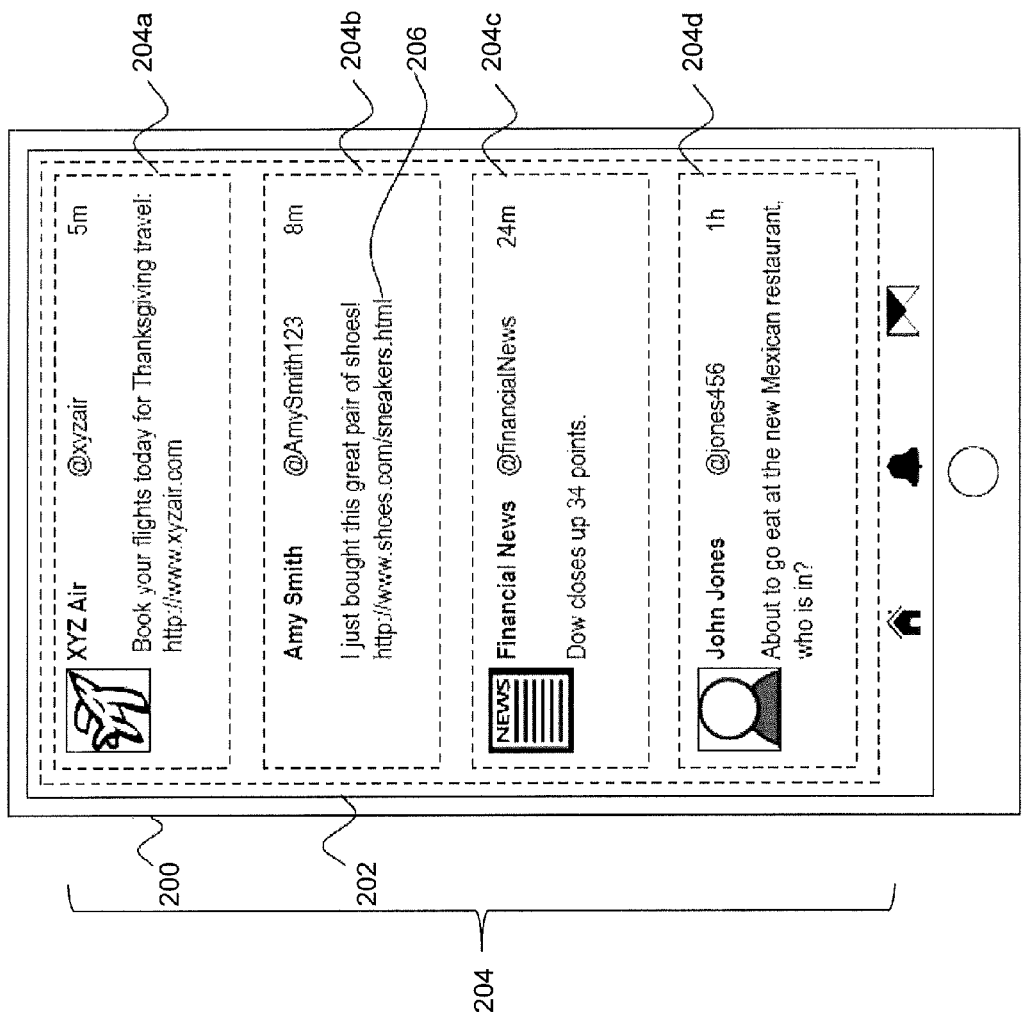
FIG. 2a is a front view illustrating an embodiment of a payer device displaying an information feed.

The method 100 begins at block 102 where an information feed is displayed that includes an information post having a product link and/or a reference to a product. Referring first to FIG. 2a, a payer device 200 includes a display 202 displaying an information feed screen 204 that includes an information feed 204 having a plurality of information posts 204a, 204b, 204c, and 204d.

An information feed provider may allow a user to "follow" other users to receive messages or other information posts that are posted by those users of the information feed provider. Users may register with an information feed provider and select other user accounts to follow, which allows the user to view messages or other information posts that are posted by other users. Users can utilize an information feed provider website to compose and submit information posts, which can then be accessed by those other users who follow that user. Users can also use a separate application provided by the information feed provider, or an application provided by another party which is configured to send and receive information posts to and from, and/or otherwise access, the information feed provider. Information posts may include only text, such as information posts 204c and 204d. Information posts may also include hyperlinks to websites, such as information post 204a, which includes a hyperlink to an airline website. Information posts may also include hyperlinks to multimedia content, such as pictures, audio, or video. Information posts may also include hyperlinks to products or product information on a merchant website. For example, information post 204b includes the user's text "I just bought this great pair of shoes!" along with a product link 206 to the pair of shoes on a merchant's website. Information post 204b may be created by the user himself or herself, or the merchant's website may provide a pre-generated message for posting or communicating by the user. In the embodiments illustrated and discussed below, the term "product" is used to reference items offered for sale by a merchant or other seller. However, "product" is not meant to be limited to items, but is meant to encompass services, donations, and/or any other situation that involves the transfer of funds from the user to another party.

In the example illustrated in FIG. 2a, the user of payer device 200 may be following the users who composed and submitted information posts 204a-204d. The information feed may update automatically or on demand. For example, if a user submits a new information post, the new information post may appear at the top of information feed 206, and the older information posts may move down the information feed 206. Information posts may be displayed to all other users who follow a specific user. Additionally, a user may address individual information posts to one or more specific users.

As personal recommendations often strongly influence other consumers to purchase similar goods, the user of payer device 200 browsing his or her information feed may also be interested in purchasing a product (e.g., the same pair of shoes as user@AmySmith123) referenced in information post 204b. Thus, in one embodiment, the user of payer device 200 may select (for example, by mouse click or touch event on a touch screen) the information post 204b to receive additional information about the product referenced by that information post 204b. For example, in the illustrated embodiment, the user may select the product link 206 in the information post 204b. In another example, rather than the product link 206, the information post 204b may simply reference a product in a text post (e.g., "I just bought Brand X shoes") or an image post (e.g., an image of Brand X shoes), and that product reference may be recognized by the information feed provider and/or other system provider and provided in the information post 204b as a selectable link. As such, the information feed provider or other system provider may include systems for analyzing information posts, recognizing text, image, or other product references in the information posts, and converting those product references to a selectable link in the information posts.

The method 100 then proceeds to block 104 where a selection of the product is received and product information for a product associated with that product is retrieved. In an embodiment, the user may select the product link 206 (or the selectable product reference), and, in response, the user device operates to retrieve, over a network, product information for a product associated with the product link or referenced product. In one embodiment, product information may be retrieved by the information feed provider or other system provider from the website of a merchant providing the product or from a merchant device of the merchant providing the product. In one embodiment, the product information may be retrieved from an information feed provider database. For example, the information feed provider may store product information, or it may retrieve product information from the website of a merchant providing the product and format the product information for presentation in an information feed. In one embodiment, the product information may also be retrieved from a payment service provider database.

Figure 2B:
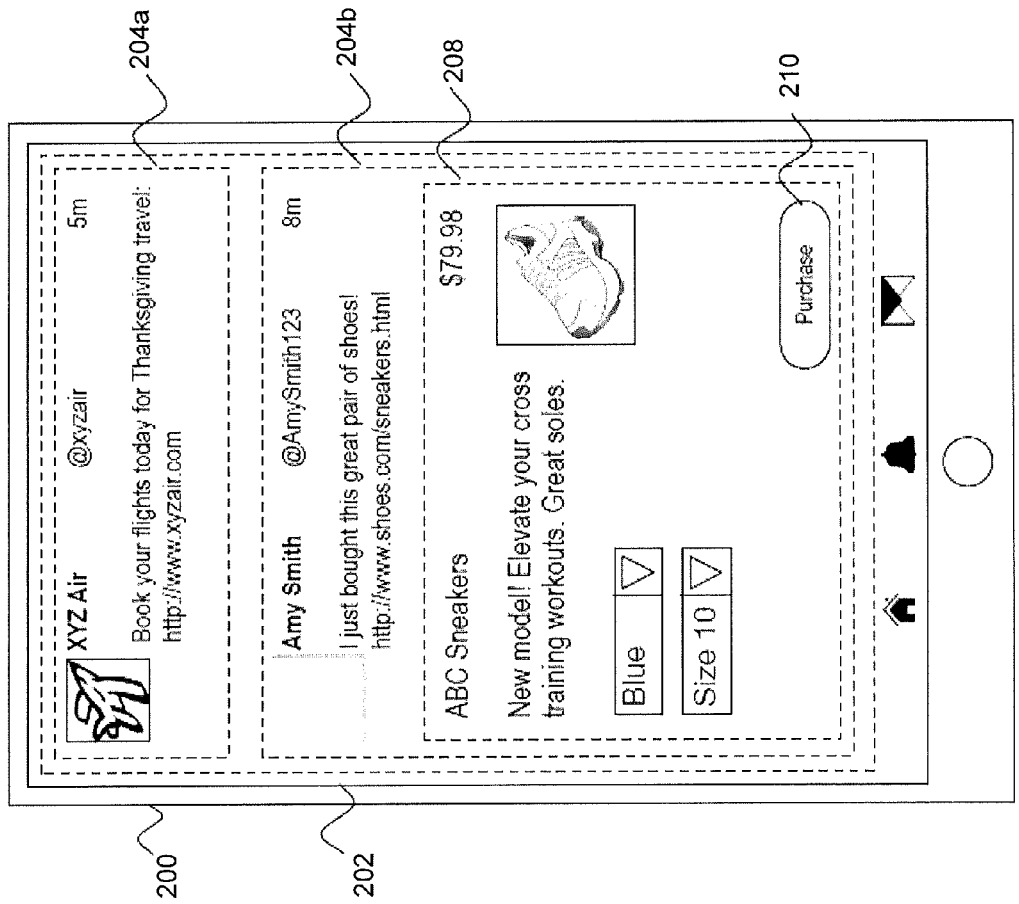
FIG. 2b is a front view illustrating an embodiment of a payer device displaying an information feed with product information displayed in association with an information post in the information feed.

Referring now to FIG. 2b, the method 100 then proceeds to block 106 where the product information and a purchase selector are displayed in association with the information post in the information feed. In one embodiment, product information is displayed 'in-line" with the information post such that the product information is provided within the information feed 204. For example, in the example of FIG. 2b, the product information 208 and purchase selector 210 are displayed directly below the original information post 204b, and within the information feed 204 as part of the information post 204b. The product information 208 may be displayed, in one embodiment, as a "product card". In the illustrated embodiment, the product card may be rendered as an extension part of an information feed provider's API. In one embodiment, the product information 208 may be displayed as a webpage rendered within the information feed 204 with a stylesheet or other formatting consistent with the remainder of the information feed 204. In one embodiment, the product information 208 may be displayed in an inline frame in the information feed 204, and the appearance of the product information 208 may be as the product information appears on the merchant's website.

In one embodiment, the information displayed in association with the information post in the information feed may include information received from the merchant regarding inventory information. For example, "Low inventory" or "Six pairs left" may be displayed. If sufficient inventory is not available, in one embodiment, the user may be permitted to place an order for the item to be shipped when the item comes back in stock. In one embodiment, if sufficient inventory is not available, an option to purchase the product (i.e., the "Purchase" button) is not displayed, and only information regarding the product is displayed. Such inventory information may be retrieved from a merchant device.

In one embodiment, the information displayed in association with the information post in the information feed may include one or more selections that allow the user to choose a size, color, or other particular characteristic of the item being purchased. For example, in the illustrated embodiment, the item being purchased is a pair of shoes, and selectors for a color and size of the shoes are provided for selection by the user.

The method 100 then proceeds to block 108, where a selection of the purchase selector is received. The selection of the purchase selector may be based on, for example, a user mouse click or touch screen input event on the purchase selector 210. The method 100 then proceeds to decision block 110, where a determination is made as to whether the user is authenticated. In an embodiment of decision block 110, the information feed provider device or other system provider devices makes a determination as to whether the user is currently authenticated with a payment service provider, a payment account provider, and/or other payment entity known in the art. In some embodiments, a user may be determined to be authenticated with a payment entity by virtue of being authenticated with the information feed provider or other system provider (e.g., through a linked authentication with the payment entity). In some embodiments, a user may be determined to be authenticated with a payment entity by virtue of authentication credentials stored by user device 200, an information feed provider device, or other system provider device. If the user is determined at decision block 110 to be authenticated, the method 100 then proceeds to block 112.

Figure 2C:
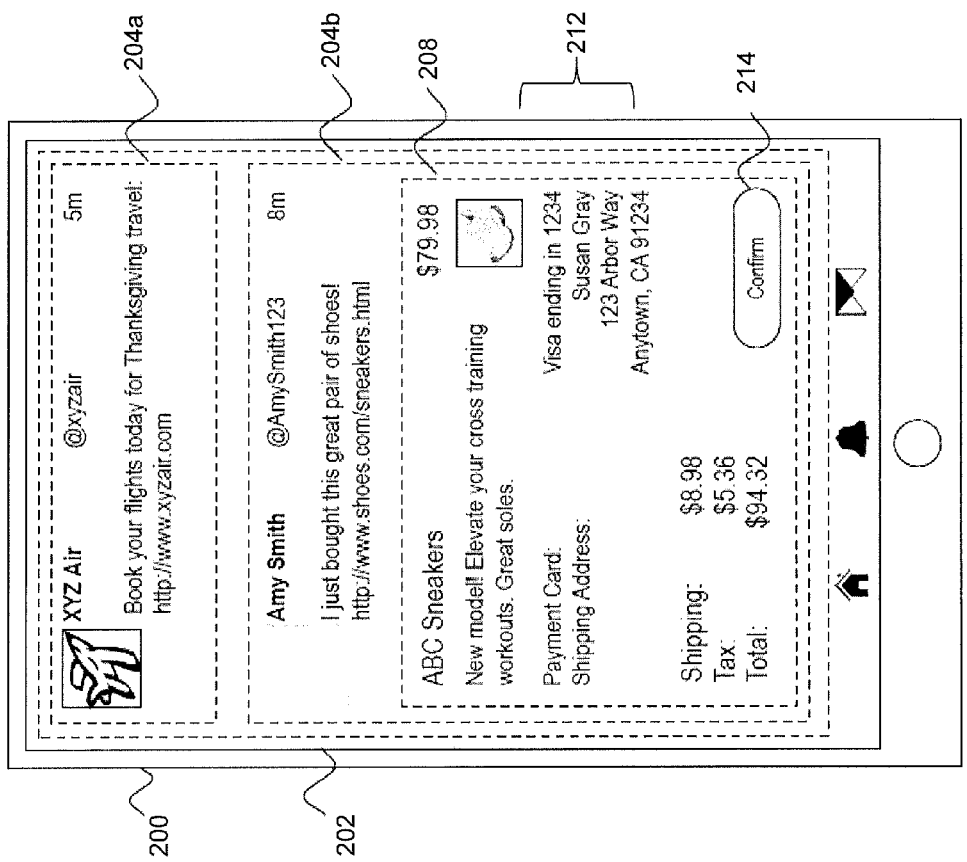
FIG. 2c is a front view illustrating an embodiment of a payer device displaying an information feed with user payment information displayed in association with an information post in the information feed.

Referring now to FIG. 2c, at block 112, user payment information is retrieved and displayed. In an embodiment, the information feed provider device or other system provider device may retrieve the user payment information over a network from a payment service provider device or payment account provider device. As shown in FIG. 2c, the user payment information 212 is displayed in association with the information post 204b, and within the information feed 204. In one embodiment, user payment information may include, but is not limited to, payment information such as a payment method (e.g., credit card number, expiration date, etc.), a payment amount (including sales tax, shipping charges, handling charges, and other applicable charges, which may be itemized or displayed as a sum total), a shipping address, a billing address, and any other information related to the purchase of the product. In one embodiment, at block 112, a "Confirm" selector 214, as shown in FIG. 2c, is also displayed with user payment information.

In one embodiment, the user payment information may be received from a payment provider service over a network, based on the user's successful previous authentication with the payment provider service. In one embodiment, user payment information may include a user's default payment information established through a payment provider service. In one embodiment, the user may be provided a drop-down or other selection box to change the payment information. User payment information may include information related to various payment methods, which may include credit card information, payment service provider account information, a "Bill Me Later" service provided by PayPal Inc. of San Jose, Calif., debit card information, and/or information related to any other payment methods known in the art. In some embodiments, merchants may limit the types of payment methods that they will accept, and the payment information retrieved at block 112 may be confirmed as acceptable by the merchant at block 112.

Upon a user selection of the "confirm" selector 214, the method 100 proceeds to block 114, where the confirmation selection is transmitted. In one embodiment, the confirmation selection may be transmitted to a payment service provider or payment account provider device. In one embodiment, the confirmation selection may be transmitted to the merchant device. Additionally, or alternatively, the confirmation selection or another message may be transmitted from the payment service provider to the merchant device. In one embodiment, transmittal of the confirmation selection may also include transmission of user payment information. For example, if the user has changed payment information for a particular transaction from the user's default payment information, such changed payment information may be transmitted upon user selection of the "Confirm" selector 214.

Figure 2D:
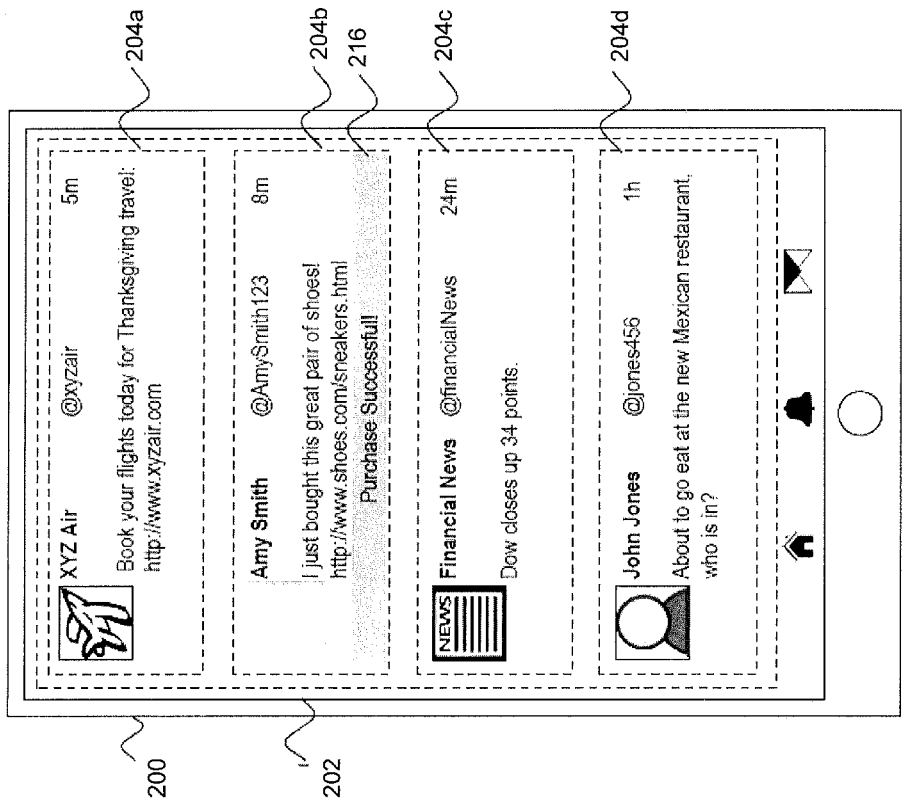
FIG. 2d is a front view illustrating an embodiment of a payer device displaying an information feed with a payment confirmation message displayed in association with an information post in the information feed.

Referring now to FIG. 2d, once the confirmation selection is transmitted, the method 100 proceeds to block 116, where the purchase is executed, and a confirmation message 216 is displayed in association with the information post in the information feed. Executing the purchase may include, for example, debiting a user's bank account or charging a user's credit card, based on the user payment information, and may be performed, in one embodiment, by a payment provider device and/or payment account provider device. Executing the purchase may also include recording a transaction with an account provider device, such as a credit card account provider device. Further, executing the purchase may also include recording the transaction or performing other processing tasks by the merchant device. Thus, for example, the ordered product may be dispatched for shipping, and the purchase may be recorded in a reporting database of the merchant. Further, as shown in FIG. 2d and with reference to FIG. 2c, the additional information (e.g., the product information and billing information in FIG. 2c) displayed in association with the information post in the information feed may be removed, and the user's information feed may be displayed as before the selection of the product, but with the inclusion of the confirmation message 216 as part of the information post 204b.

If, at decision block 110, the user is not authenticated, the method 100 proceeds to decision block 116. At decision block 116, a determination is made by the information feed provider device or other system provider device as to whether authentication is required. For example, certain merchants may require registration and authentication with a payment service provider or payment account provider before purchasing a product, to reduce fraudulent transactions or due to commercial relationships between merchants and payment service providers.

Figure 2E:
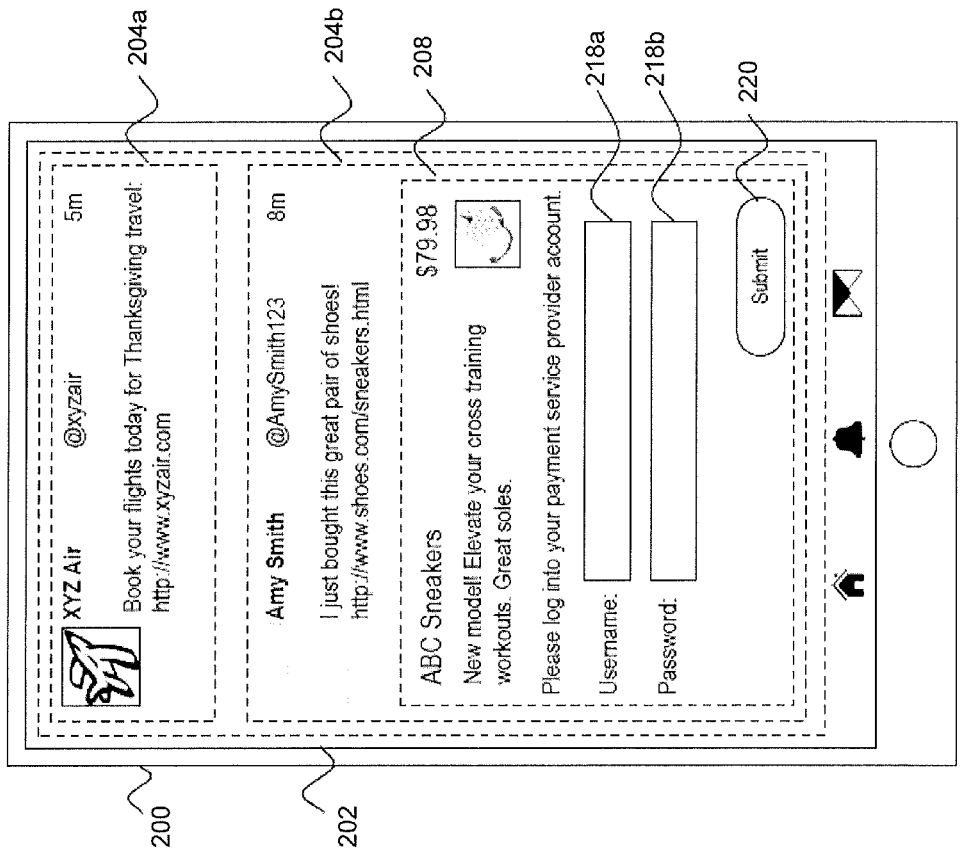
FIG. 2e is a front view illustrating an embodiment of a payer device displaying an information feed with user authentication inputs displayed in association with an information post in the information feed.

Referring now to FIG. 2e, if authentication is required, the method 100 proceeds to block 118. At block 118, user authentication information is requested. The user authentication information is requested by the information feed provider device or other system provider device in association with the information post 204b in the information feed 204. For example, as shown in FIG. 2e, input boxes 218a and 218b for a username and password, respectively, of a payment service provider or payment account provider may be displayed below the information post 204b and within the information feed 204, and the user may enter his or her username and password, and select the "Submit" button 220 to be authenticated with a payment service provider or payment account provider. The authentication information may be transmitted over a network to the payment service provider or payment account provider. Following the transmission of user authentication information, the method 100 proceeds to decision block 120, where it is determined whether the authentication with the payment service provider or payment account provider was successful. As is known in the art, a payment service provider and/or payment account provider may transmit an authentication confirmation in response to receiving user authentication information. In some embodiments, the payment service provider or payment account provider may actually provide the input boxes 218a and 218b in the information feed 204 at block 118 in order to authenticate the user, and then inform the information feed provider or other system provider if that authentication was successful. If the information feed provider or other system provider determines that the user's authentication with the payment service provider or payment account provider is successful, the method 100 proceeds to blocks 112, 114, and 116 to operate substantially as described above. If authentication with the payment service provider is not successful, the method 100 may return to block 118, and the user may be provided an additional opportunity or additional opportunities to enter authentication information.

Figure 2F:
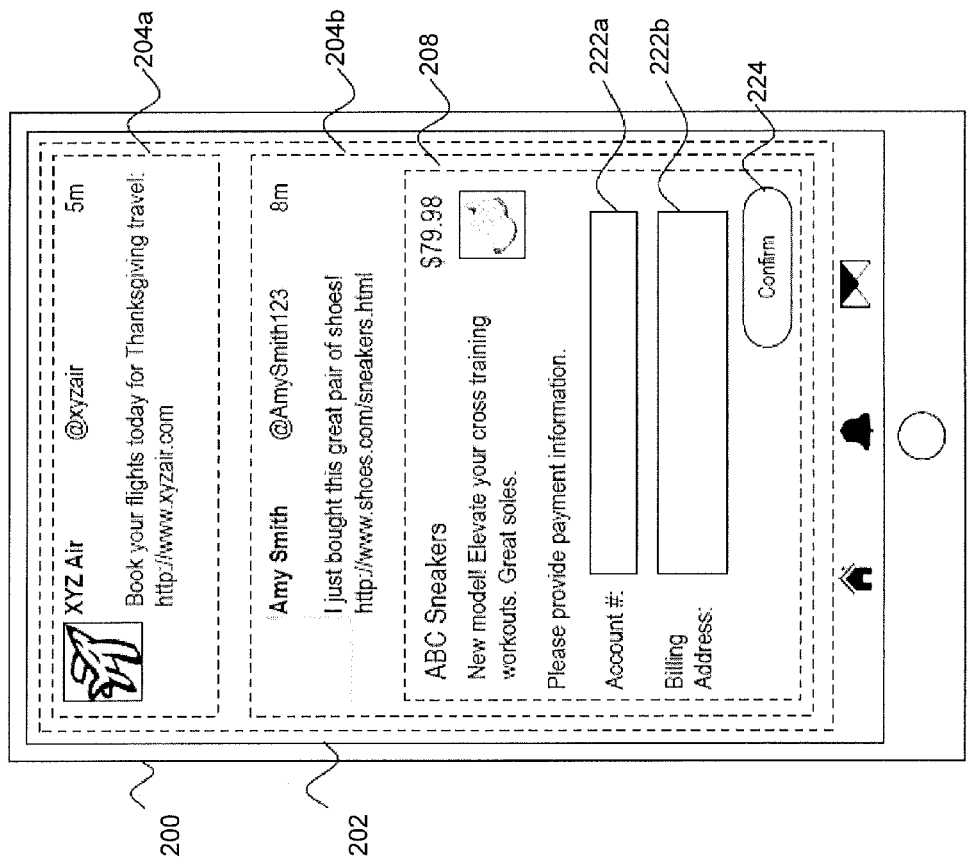
FIG. 2f is a front view illustrating an embodiment of a payer device displaying an information feed with user payment information inputs displayed in association with an information post in the information feed.

Referring now to FIG. 2f, if authentication with a payment service provider is not required, the method 100 proceeds to block 122. At block 122, user payment information may be requested from the user. In some examples, the user payment information may be requested as discussed below by the information feed provider device, the payment service provider device, a payment account provider device, a merchant device, or other system provider device. As such, the information feed provider may provide access to the information feed 204 to other entities (e.g., the payment service provider device, a payment account provider device, a merchant device) to retrieve user payer information. The user payment information may be requested in association with the information post in the information feed. For example, as shown in FIG. 2f, an account number and billing name and address may be requested from a user using input boxes 222a and 222b. Other user payment information may also or alternatively be requested, such as a credit card number and expiration date, bank routing and account number, or any other payment information. A "Confirm" button or selector 224 may also be displayed. Upon selection of the "Confirm" button or selector 224, the method 100 proceeds to block 124, where the user payment information is transmitted. As described above, user payment information may be transmitted to a payment service provider, a payment account provider, a merchant, and/or other system provider devices. Referring now to FIG. 2d, the method 100 then proceeds to block 116 as described above, where the purchase may be executed and a confirmation message displayed. In some embodiments in which the user does not have an account with the payment service provider, merchant, or other system provider, after the purchase is executed and the confirmation message is displayed, the user may be provided an option to create an account with the payment service provider, merchant, or other system provider with the information used to make the purchase during the method 100.

As described herein, the process of purchasing the product, including the display of product information, retrieval of user payment information, and the completion of the purchase itself, may occur with the involvement or assistance of a merchant. Accordingly, the merchant remains the merchant of record, and thus the merchant can accurately track products sold for reporting, inventory management, and other tasks.

In one embodiment, a user of the information feed provider may be compensated for mentioning a product in an information post. As one example, the product link included in the information post posted by the user may include additional information identifying the user posting the information post. If a transaction is successfully completed based on the product link posted by the user in the information post, an account of the user's (for example, the user's account with the merchant) may be credited a certain amount, to provide an incentive to the user to post similar information posts. If the user's information post is subsequently re-posted by other users (e.g., retweeted), the user may be credited for purchases that arise as a result of such re-posting.

Thus, systems and methods have been described that provide for purchases of products to be conducted completely in-line with a user's information feed. A product reference to a product in an information post provided in an information feed is provided or made selectable by a user of that information feed to have information about that product displayed in association with that information post/information feed, and allows that user to select that product for purchase without leaving that information feed. Furthermore, from the user's perspective, every aspect of the purchase of that product may be completed within the information feed, including provision of and/or review of user payment information, confirmation of the purchase, and/or variety of other purchasing aspects known in the art. As such, purchases of products references in an information post on an information feed no longer require the user to open a separate web browser application, or navigate to a separate website, in order to purchase a product referenced in the information feed.

Figure 3:
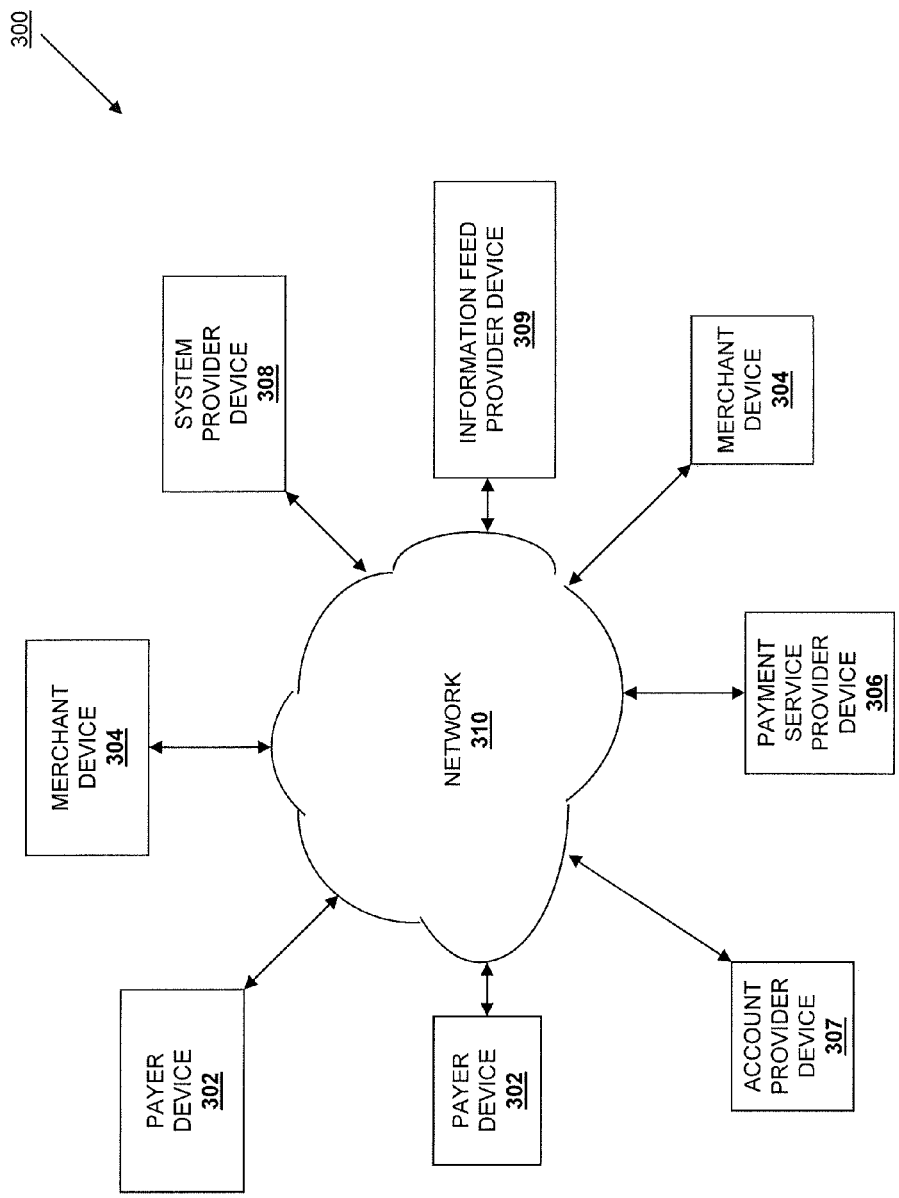
FIG. 3 is a schematic view illustrating an embodiment of a networked system.

Referring now to FIG. 3, an embodiment of a network-based system 300 for implementing one or more processes described herein is illustrated. As shown, network-based system 300 may comprise or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 3 may be deployed in other ways and that the operations performed and/or the services provided by such servers may be combined or separated for a given implementation and may be performed by a greater number or fewer number of servers. One or more servers may be operated and/or maintained by the same or different entities.

The embodiment of the networked system 300 illustrated in FIG. 3 includes a plurality of payer devices 302, a plurality of merchant devices 304, a payment service provider device 306, an account provider devices 307, a system provider device 308, and/or an information feed provider device 309, in communication over a network 310. Any of the payer devices 302 may be the payer device 200 operated by the users, discussed above. The merchant devices 304 may be the merchant devices discussed above and may be operated by the merchants discussed above. The payment service provider device 306 may be the payment service provider devices discussed above and may be operated by a payment service provider such as, for example, PayPal Inc. of San Jose, Calif. The account provider devices 307 may be the account provider devices discussed above and may be operated by the account providers discussed above such as, for example, credit card account providers, bank account providers, savings account providers, and a variety of other account providers known in the art. The system provider device 308 may be the system provider devices discussed above and may be operated by the system providers discussed above. The information feed provider devices 309 may be information feed provider devices discussed above and may be operated by the information feed providers discussed above.

The payer devices 302, merchant devices 304, payment service provider device 306, account provider device 308, system provider device 308, and/or information feed provider device 309 may each include one or more processors, memories, and other appropriate components for executing instructions such as program code and/or data stored on one or more computer readable mediums to implement the various applications, data, and steps described herein. For example, such instructions may be stored in one or more computer readable mediums such as memories or data storage devices internal and/or external to various components of the system 300, and/or accessible over the network 310.

The network 310 may be implemented as a single network or a combination of multiple networks. For example, in various embodiments, the network 310 may include the Internet and/or one or more intranets, landline networks, wireless networks, and/or other appropriate types of networks.

The payer device 302 may be implemented using any appropriate combination of hardware and/or software configured for wired and/or wireless communication over network 310. For example, in one embodiment, the payer device 302 may be implemented as a personal computer of a user in communication with the Internet. In other embodiments, the payer device 302 may be a smart phone, personal digital assistant (PDA), laptop computer, and/or other types of computing devices.

The payer device 302 may include one or more browser applications which may be used, for example, to provide a convenient interface to permit the payer to browse information available over the network 310. For example, in one embodiment, the browser application may be implemented as a web browser configured to view information available over the Internet.

The payer device 302 may also include one or more toolbar applications which may be used, for example, to provide user-side processing for performing desired tasks in response to operations selected by the payer. In one embodiment, the toolbar application may display a user interface in connection with the browser application.

The payer device 302 may further include other applications as may be desired in particular embodiments to provide desired features to the payer device 302. In particular, the other applications may include a payment application for payments assisted by a payment service provider through the payment service provider device 306. The other applications may also include security applications for implementing user-side security features, programmatic user applications for interfacing with appropriate application programming interfaces (APIs) over the network 310, or other types of applications. Email and/or text applications may also be included, which allow the payer to send and receive emails and/or text messages through the network 310. Information feed provider applications may also be included, which allow the payer or user to access an information feed provider as discussed herein. The payer device 302 includes one or more user and/or device identifiers which may be implemented, for example, as operating system registry entries, cookies associated with the browser application, identifiers associated with hardware of the payer device 302, or other appropriate identifiers, such as a phone number. In one embodiment, the user identifier may be used by the payment service provider device 306 and/or account provider device 307 to associate the user with a particular account as further described herein. In one embodiment, the user identifier may be used to view information posts, as described herein.

The merchant device 304 may be maintained, for example, by a conventional or on-line merchant, conventional or digital goods seller, individual seller, and/or application developer offering various products and/or services in exchange for payment to be received conventionally or over the network 310. In this regard, the merchant device 304 may include a database identifying available products and/or services (e.g., collectively referred to as items) which may be made available for viewing and purchase by the payer.

The merchant device 304 also includes a checkout application which may be configured to facilitate the purchase by the payer of items. The checkout application may be configured to accept payment information from the user through the payer device 302, the account provider through the account provider device 307, and/or from the payment service provider through the payment service provider device 306 over the network 310.

Figure 4:
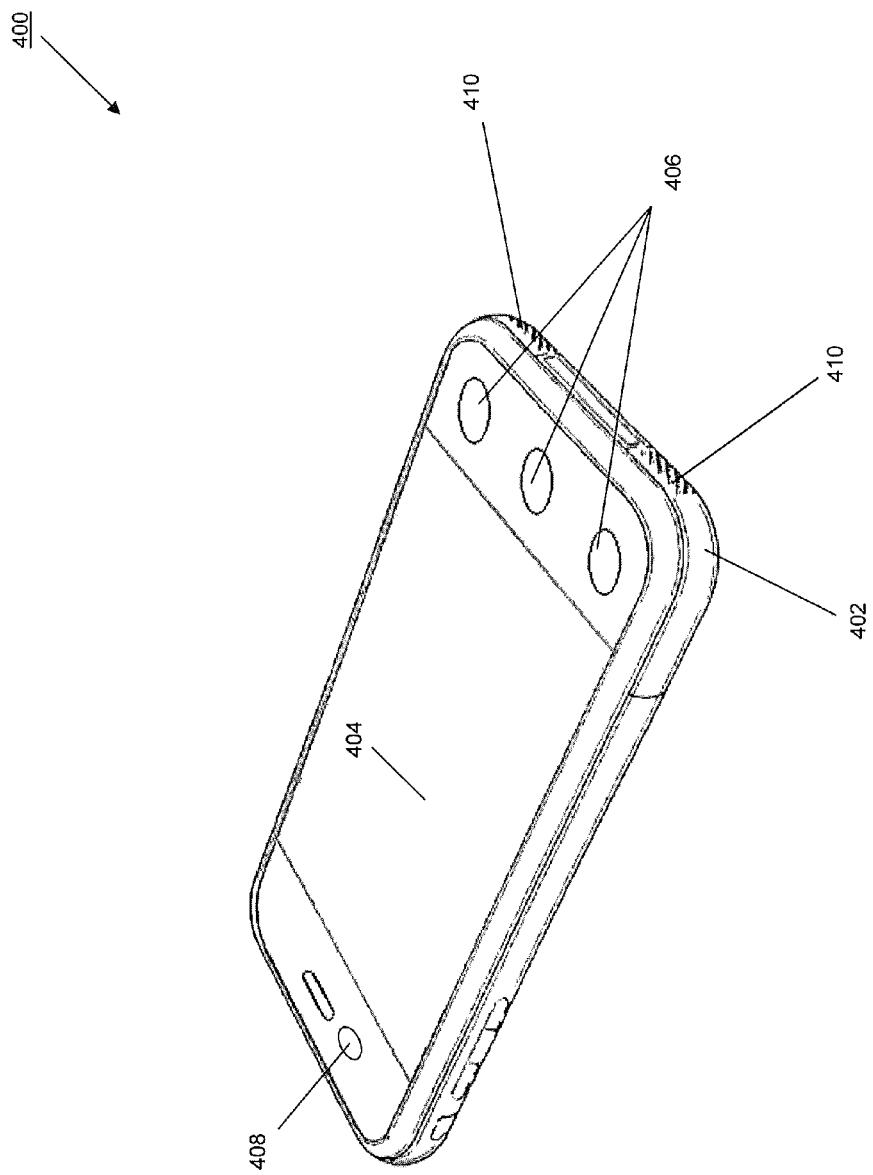
FIG. 4 is a perspective view illustrating an embodiment of a payer device.

Referring now to FIG. 4, an embodiment of a payer device 400 is illustrated. The payer device 400 may be the payer devices 200 and/or 302. The payer device 400 includes a chassis 402 having a display 404 and an input device including the display 404 and a plurality of input buttons 406. The payer device 400 further includes a camera 408 and one or more audio input/output devices (e.g., microphones, speakers) 410. One of skill in the art will recognize that the payer device 400 is a portable or mobile phone including a touch screen input device and a plurality of input buttons that allow the functionality discussed above with reference to the method 100. However, a variety of other portable/mobile payer devices and/or desktop payer devices may be used in the method 100 without departing from the scope of the present disclosure.

Figure 5:
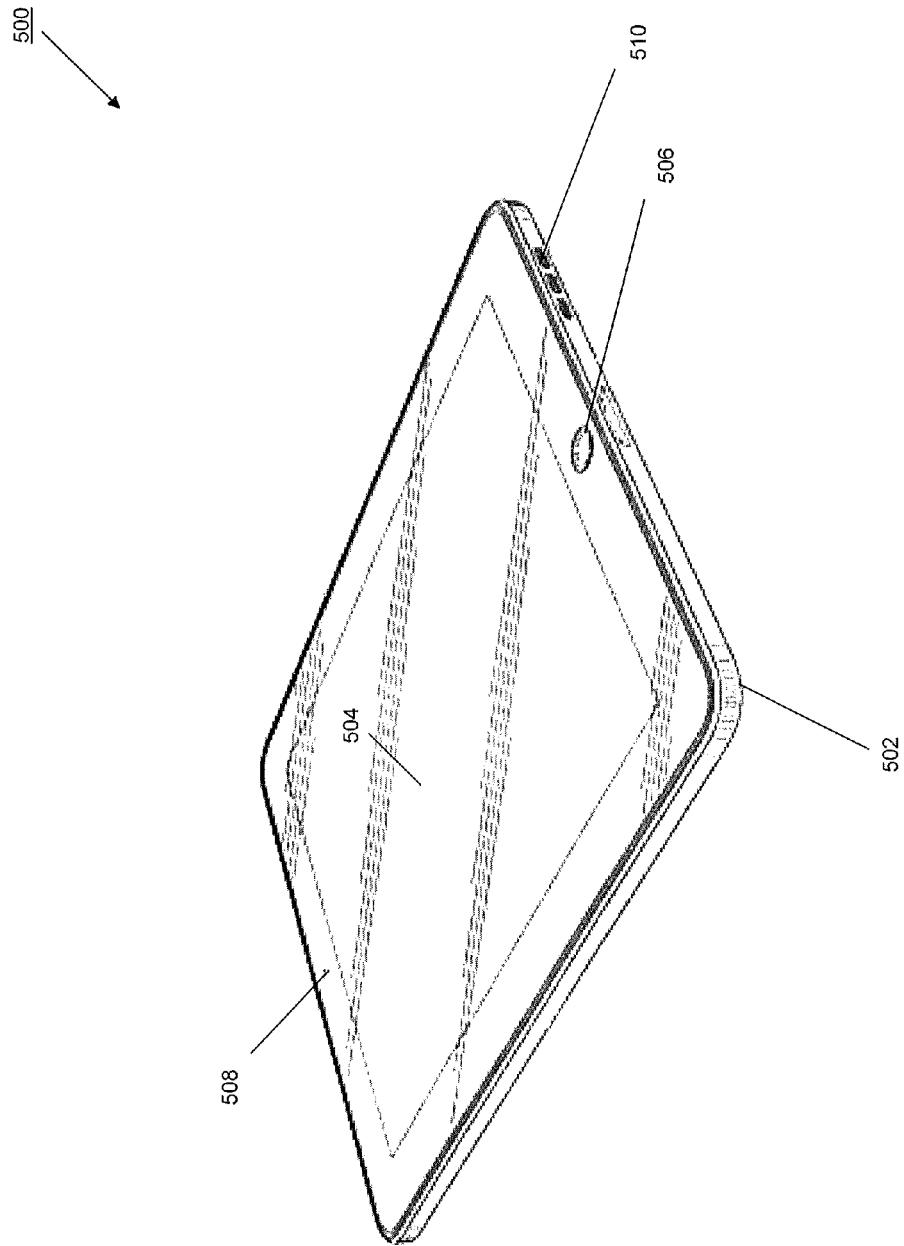
FIG. 5 is a perspective view illustrating a further embodiment of a payer device.

Referring now to FIG. 5, a further embodiment of a payer device 500 is illustrated. The payer device 400 may be the payer devices 200 and/or 302. The payer device 500 includes a chassis 502 having a display 504 and an input device including the display 504. The payer device 500 may also include an input button 406 and one or more audio input/output device 508 (e.g. microphones, speakers). One of skill in the art will recognize that the payer device 500 is a portable or mobile table device including a touch screen input device and a plurality of input buttons that allow the functionality discussed above with reference to the method 100. However, a variety of other portable/mobile payer devices and/or desktop payer devices may be used in the method 100 without departing from the scope of the present disclosure.

Figure 6:
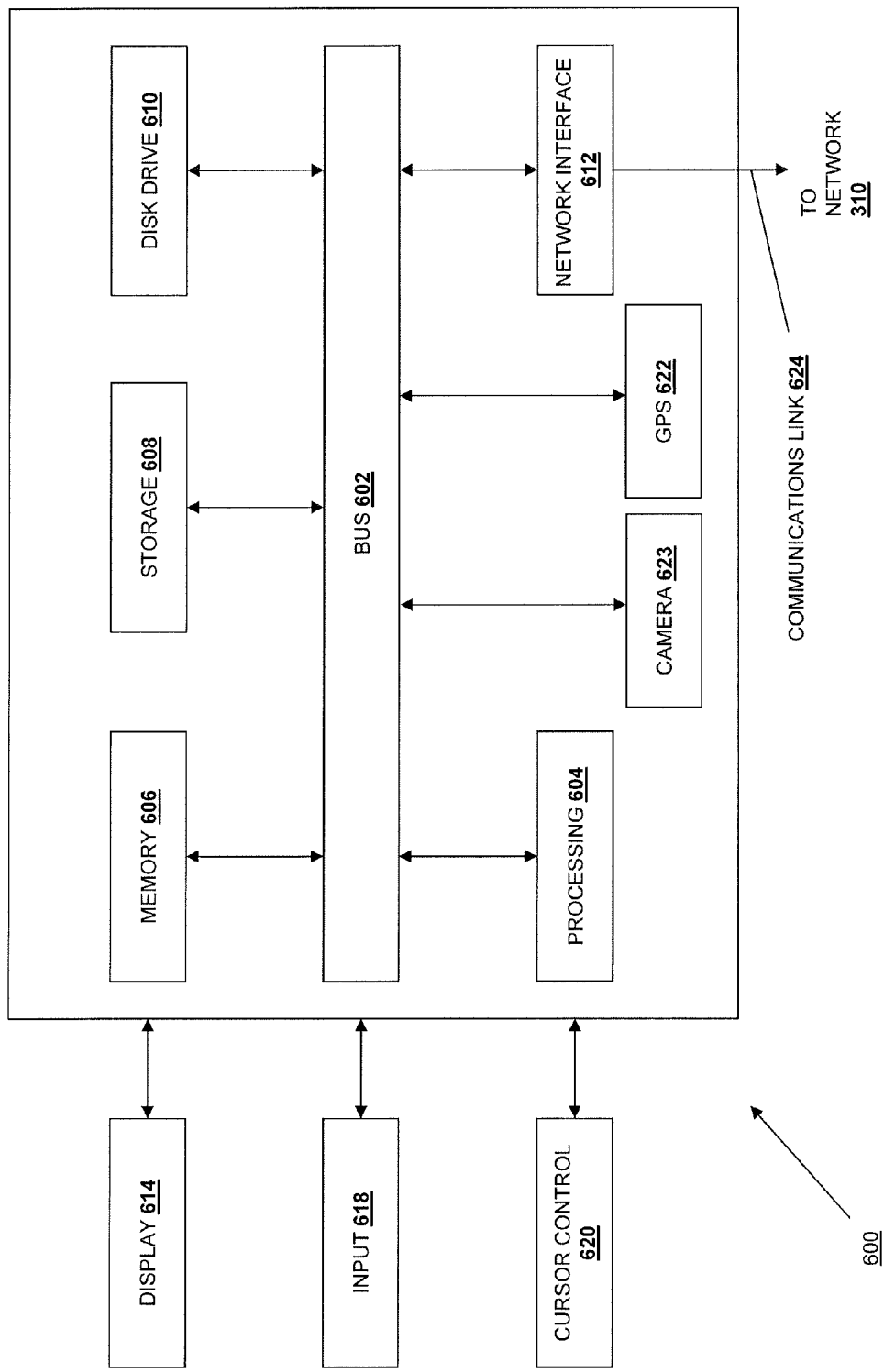
FIG. 6 is a schematic view illustrating an embodiment of a computer system.

Referring now to FIG. 6, an embodiment of a computer system 600 suitable for implementing, for example, the payer device 200, the payer device 302, the payer device 400, the payer device 500, the merchant devices 304, the payment service provider device 306, the account provider device 307, the system provider device 308, and/or the information feed provider device 309, is illustrated. It should be appreciated that other devices utilized by payers, merchants, payment service providers, account providers, system providers, and information feed providers in the system discussed above may be implemented as the computer system 600 in a manner as follows.

In accordance with various embodiments of the present disclosure, computer system 600, such as a computer and/or a network server, includes a bus 602 or other communication mechanism for communicating information, which interconnects subsystems and components, such as a processing component 604 (e.g., processor, micro-controller, digital signal processor (DSP), etc.), a system memory component 606 (e.g., RAM), a static storage component 608 (e.g., ROM), a disk drive component 610 (e.g., magnetic or optical), a network interface component 612 (e.g., modem or Ethernet card), a display component 614 (e.g., CRT or LCD), an input component 618 (e.g., keyboard, keypad, or virtual keyboard), a cursor control component 620 (e.g., mouse, pointer, or trackball), a location determination component 622 (e.g., a Global Positioning System (GPS) device as illustrated, a cell tower triangulation device, and/or a variety of other location determination devices known in the art), and/or a camera device 623. In one implementation, the disk drive component 610 may comprise a database having one or more disk drive components.

In accordance with embodiments of the present disclosure, the computer system 600 performs specific operations by the processor 604 executing one or more sequences of instructions contained in the memory component 606, such as described herein with respect to the payer devices 200, 302, 400 and 500, the merchant device(s) 304, the payment service provider device 306, the account provider device(s) 307, the system provider device 308, and/or the information feed provider device 309. Such instructions may be read into the system memory component 606 from another computer readable medium, such as the static storage component 608 or the disk drive component 610. In other embodiments, hard-wired circuitry may be used in place of or in combination with software instructions to implement the present disclosure.

Logic may be encoded in a computer readable medium, which may refer to any medium that participates in providing instructions to the processor 604 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 610, volatile media includes dynamic memory, such as the system memory component 606, and transmission media includes coaxial cables, copper wire, and fiber optics, including wires that comprise the bus 602. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the present disclosure, execution of instruction sequences to practice the present disclosure may be performed by the computer system 600. In various other embodiments of the present disclosure, a plurality of the computer systems 600 coupled by a communication link 624 to the network 310 (e.g., such as a LAN, WLAN, PTSN, and/or various other wired or wireless networks, including telecommunications, mobile, and cellular phone networks) may perform instruction sequences to practice the present disclosure in coordination with one another.

The computer system 600 may transmit and receive messages, data, information and instructions, including one or more programs (i.e., application code) through the communication link 624 and the network interface component 612. The network interface component 612 may include an antenna, either separate or integrated, to enable transmission and reception via the communication link 624. Received program code may be executed by processor 604 as received and/or stored in disk drive component 610 or some other non-volatile storage component for execution.

Figure 7:
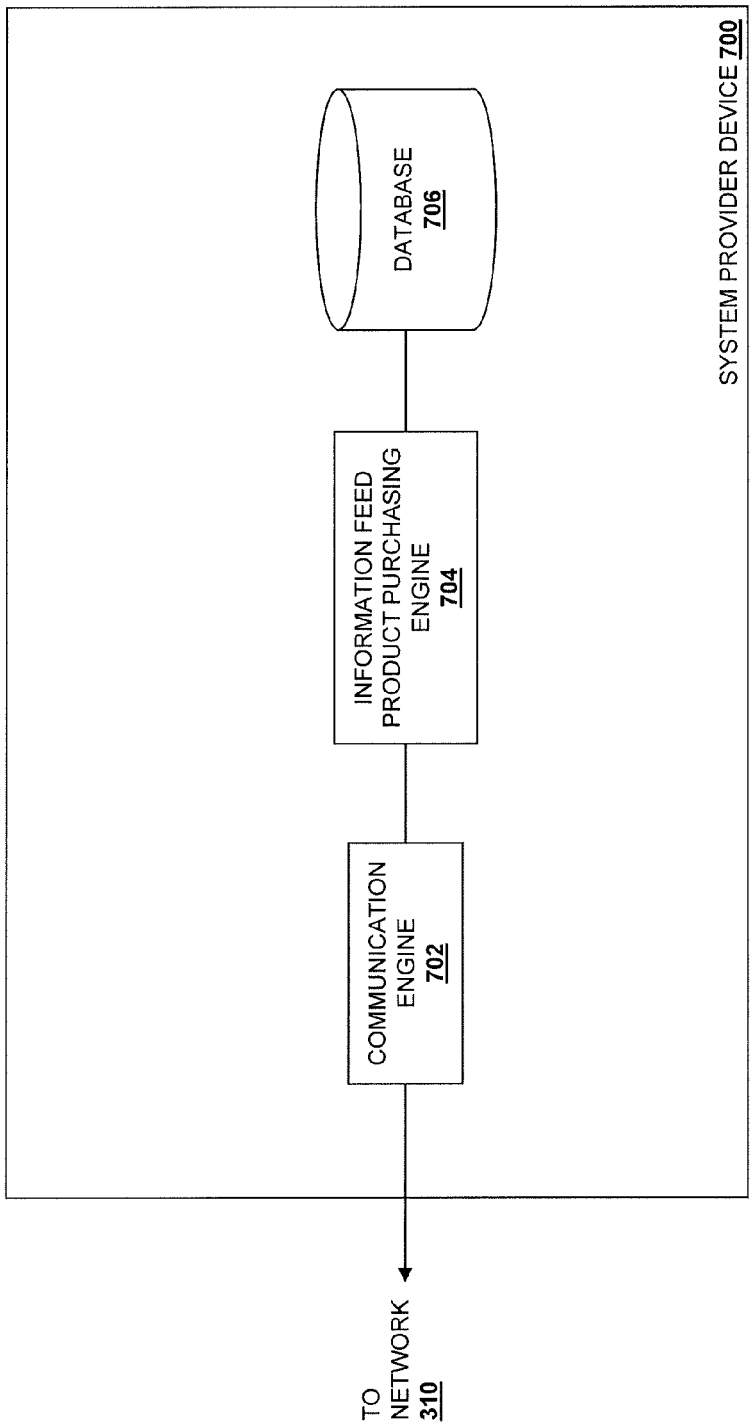
FIG. 7 is a schematic view illustrating an embodiment of a system provider device.

Referring now to FIG. 7, an embodiment of a system provider device device 700 is illustrated. In an embodiment, the device 700 may be the information feed provider device 309 and/or the system provider device 308 discussed above. The device 700 includes a communication engine 702 that is coupled to the network 310 and to an information feed product purchasing engine 704 that is coupled to a database 706. The communication engine 702 may be software or instructions stored on a computer-readable medium that allows the device 700 to send and receive information over the network 310. The information feed product purchasing engine 704 may be software or instructions stored on a computer-readable medium that is operable to display an information feed including an information post that references a product, receive a selection of the reference product, retrieve product information for the selected product, display the product information in association with the information post in the information feed, receive a selection of a purchase selector, determine whether a user is authenticated, retrieve and display user payment information in association with an information post in an information feed, transmit confirmation and user payment information, execute a purchase, display a confirmation in association with an information post in an information feed, determine whether user authentication is required, request user authentication in association with an information post in an information feed, determine whether authentication is successful, request user payment information in association with an information post in an information feed, transmit user payment information, and/or provide any of the other functionality that is discussed above. While the database 706 has been illustrated as located in the payment provider device 700, one of skill in the art will recognize that it may be connected to the information feed product purchasing engine 704 through the network 310 without departing from the scope of the present disclosure.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have focused on merchants and payers; however, a payer or consumer can pay, or otherwise interact with any type of recipient, including charities and individuals. The payment does not have to involve a purchase, but may be a loan, a charitable contribution, a gift, etc. Thus, payee as used herein can also include charities, individuals, and any other entity or person receiving a payment from a payer. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. An information feed product purchasing system, comprising:
    a non-transitory memory; and
    one or more hardware processors coupled to the non-transitory memory and configured to read instructions from the non-transitory memory to cause the system to perform operations comprising:
        displaying, on a user device of a user, a feed provided by a social networking service that includes a plurality of posts, wherein a first post of the plurality of posts includes at least one text string;
        performing text recognition operations on the at least one text string displayed on the user device in the first post to analyze the at least one text string and recognize a product name of a product in the at least one text string;
        converting, in response to recognizing the product name of the product in the at least one text string, at least a portion of the at least one text string to a selectable link for the product;
        displaying, on the user device, the selectable link as part of the at least one text string in the first post in the feed;
        receiving, from the user device, a selection of the selectable link that is part of the at least one text string in the first post in the feed; and
        in response to receiving the selection of the selectable link that is part of the at least one text string in the first post in the feed:
            retrieving product information for the product;
            displaying, on the user device, the product information as part of the first post in the feed;
            retrieving user payment information of the user;
            displaying, on the user device, the user payment information as part of the first post in the feed;
            displaying, on the user device, a purchase confirmation element as part of the first post in the feed;
            receiving, from the user device, a purchase confirmation through an input provided using the purchase confirmation element that is part of the first post in the feed; and
            causing, in response to receiving the purchase confirmation, a purchase of the product using the user payment information.

2. The system of claim 1, wherein the operations further comprise:
    displaying, on the user device, a confirmation message in response to determining that the purchase of the product has been completed.

3. The system of claim 1, wherein the operations further comprise:
    displaying, on the user device, a login information request for a payment provider as part of the first post in the feed, wherein the login information request includes at least one login information input; and
    receiving, from the user device, login information for the payment provider through the at least one login information input.

4. The system of claim 1, wherein the operations further comprise:
    displaying on the user device, a payment information request including at least one payment information input as part of the first post in the feed; and
    receiving, from the user device, the user payment information through the at least one payment information input.

5. The system of claim 4, wherein the operations further comprise:
    displaying, on the user device, an offer to create an account with a payment provider using the user payment information.

6. The system of claim 1, wherein converting at least the portion of the at least one text string to the selectable link further includes:

converting the product name of the product in the at least one text string to the selectable link.

7. A computer-implemented method for providing in-feed purchasing of products referenced in a feed, comprising:

displaying, by a feed provisioning subsystem, on a user device of a user, a feed provided by a social networking service that includes a plurality of posts, wherein a first post of the plurality of posts includes at least one text string;

performing, by a text recognition subsystem and at least one processor, text recognition operations on the at least on text string displayed on the user device in the first post to analyze the at least one text string and recognize a product name of a product in the at least one text string;

converting, by a text conversion subsystem and at least one processor, in response to recognizing the product name of the product in the at least one text string, at least a portion of the at least one text string to a selectable link for the product;

displaying, by the feed provisioning subsystem, on the user device, the selectable link as part of the at least one text string in the first post in the feed;

receiving, by an in-feed purchasing subsystem from an input subsystem on the user device, a selection of the selectable link that is part of the at least one text string in the first post in the feed; and in response to receiving the selection of the selectable link that is part of the at least one text string in the first post in the feed:

retrieving product information for the product;

displaying, by an in-feed purchasing subsystem, on the user device, the product information as part of the first post in the feed;

retrieving user payment information of the user; displaying, by the in-feed purchasing subsystem, on the user device, the user payment information as part of the first post in the feed;

displaying, by the in-feed purchasing subsystem, on the user device, a purchase confirmation element as part of the first post in the feed;

receiving, by the in-feed purchasing subsystem from the input subsystem on the user device, a purchase confirmation through an input provided using the purchase confirmation element that is part of the first post in the feed; and causing, by the in-feed purchasing subsystem in response to receiving the purchase confirmation, a purchase of the product using the user payment information.

8. The computer-implemented method of claim 7, further comprising:

displaying, by the in-feed purchasing subsystem, on the user device, a confirmation message in response to determining that the purchase of the product has been completed.

9. The computer-implemented method of claim 7, further comprising:

displaying, by the in-feed purchasing subsystem, on the user device, a login information request for a payment provider as part of the first post in the feed, wherein the login information request includes at least one login information input; and receiving, by the in-feed purchasing subsystem from the input subsystem on the user device, login information for the payment provider through the at least one login information input.

10. The computer-implemented method of claim 7, further comprising:

displaying, by the in-feed purchasing subsystem, on the user device, a payment information request including at least one payment information input as part of the first post in the feed; and receiving, by the in-feed purchasing subsystem from the user device, the user payment information through the at least one payment information input.

11. The computer-implemented method of claim 10, further comprising:

displaying, by the in-feed purchasing subsystem, on the user device, an offer to create an account with a payment provider using on the user payment information.

12. The computer-implemented method of claim 7, wherein the product information includes inventory information associated with the product.

13. The computer-implemented method of claim 7, wherein converting at least a portion of the at least one text string to the selectable link for the product further includes:

converting, by the text conversion subsystem, the product name of the product in the at least one text string to the selectable link.

14. A non-transitory machine-readable medium having stored thereon machine-readable instructions executable to cause a machine to perform operations comprising:

displaying, on a user device of a user, a feed provided by a social networking service that includes a plurality of posts, wherein a first post of the plurality of posts includes at least one text string, performing text recognition operations on the at least one text string displayed on the user device in the first post to analyze the at least one text string and recognize a product name of a product in the at least one text string;

converting, in response to recognizing the product name in the portion of the at least one text string, at least a portion of the at least one text string to a selectable link for the product;

displaying, on the user device, the selectable link as part of the at least one text string in the first post in the feed;

receiving, from the user device, a selection of the selectable link that is part of the at least one text string in the first post in the feed; and in response to receiving the selection of the selectable link that is part of the at least one text string in the first post in the feed:

retrieving product information for the product;

displaying, on the user device, the product information as part of the first post in the feed;

retrieving user payment information of the user;

displaying, on the user device, the user payment information as part of the first post in the feed;

displaying, on the user device, a purchase confirmation element as part of the first post in the feed;

receiving, from the user device, a purchase confirmation through an input provided using the purchase confirmation element that is part of the first post in the feed; and causing, in response to receiving the purchase confirmation, a purchase of the product using the user payment information.

15. The non-transitory machine-readable medium of claim 14, wherein the operations further comprise:

displaying, on the user device, a confirmation message in response to determining that the purchase of the product has been completed.

16. The non-transitory machine-readable medium of claim 14, wherein the operations further comprise:
  displaying, on the user device, a login information request for a payment provider as part of the first post in the feed, wherein the login information request includes at least one login information input; and
  receiving, from the user device, login information for the payment provider through the at least one login information input.

17. The non-transitory machine-readable medium of claim 14, wherein the operations further comprise:
  displaying on the user device, a payment information request including at least one payment information input as part of the first post in the feed; and
  receiving, from the user device, the user payment information through the at least one payment information input.

18. The non-transitory machine-readable medium of claim 17, wherein the operations further comprise:
  displaying, on the user device, an offer to create an account with a payment provider using the user payment information.

19. The non-transitory machine-readable medium of claim 14, wherein the product information includes inventory information associated with the product.

20. The non-transitory machine-readable medium of claim 14, wherein converting at least the portion of the at least one text string to the selectable link for the product further includes:
  converting the product name of the product in the at least one text string to the selectable link.

* * * * *